United States Patent [19]

Langley et al.

[11] 4,434,389
[45] Feb. 28, 1984

[54] MOTOR WITH REDUNDANT WINDINGS

[75] Inventors: Lawrence W. Langley, Christiansburg; Roger B. Bross, Radford, both of Va.

[73] Assignee: Kollmorgen Technologies Corporation, Dallas, Tex.

[21] Appl. No.: 201,478

[22] Filed: Oct. 28, 1980

[51] Int. Cl.³ .......................................... H02K 29/00
[52] U.S. Cl. ..................................... 318/254; 318/138
[58] Field of Search ........ 310/112, 126, 134, 141–144, 310/146, 149, 150, 254, 46, 166, 179, 184, 216; 318/138, 254, 639, 701

[56] References Cited

U.S. PATENT DOCUMENTS

| | | | |
|---|---|---|---|
| 2,805,373 | 9/1957 | Bonnell | 310/112 X |
| 3,454,857 | 7/1969 | Farrand et al. | 310/254 |
| 3,586,942 | 6/1971 | McMahan | 318/254 |
| 3,679,956 | 7/1972 | Redmond | 318/564 |
| 3,866,099 | 2/1975 | Bourbeau | 318/254 |
| 3,921,017 | 11/1975 | Hallerbäck | 310/216 |
| 3,950,686 | 4/1976 | Randall | 318/564 |
| 4,035,699 | 7/1977 | Schade | 318/138 |
| 4,074,160 | 2/1978 | Broadway | 310/184 |
| 4,162,438 | 7/1979 | Osder | 318/564 |

FOREIGN PATENT DOCUMENTS 2275054 9/1976 France.

Primary Examiner—J. V. Truhe
Assistant Examiner—Saul M. Bergmann
Attorney, Agent, or Firm—Morgan, Finnegan, Pine, Foley & Lee

[57] ABSTRACT

An electric motor is wound with redundant sets of windings which are energized by independent electric circuits to enable operation of the motor even in the presence of a failure of a winding and a failure of an energization circuit. The motor may be of the permanent magnet form with electronic switching of the winding currents in lieu of switching via a commutator, known as a brushless DC motor, in which case separate sensing devices, such as Hall effect devices, are employed with each winding set and energization circuit for sensing the relative position between the moving and stationary members of the motor. The sets of windings, when placed on the stator, are physically spaced apart so as to minimize magnetic coupling therebetween.

3 Claims, 6 Drawing Figures

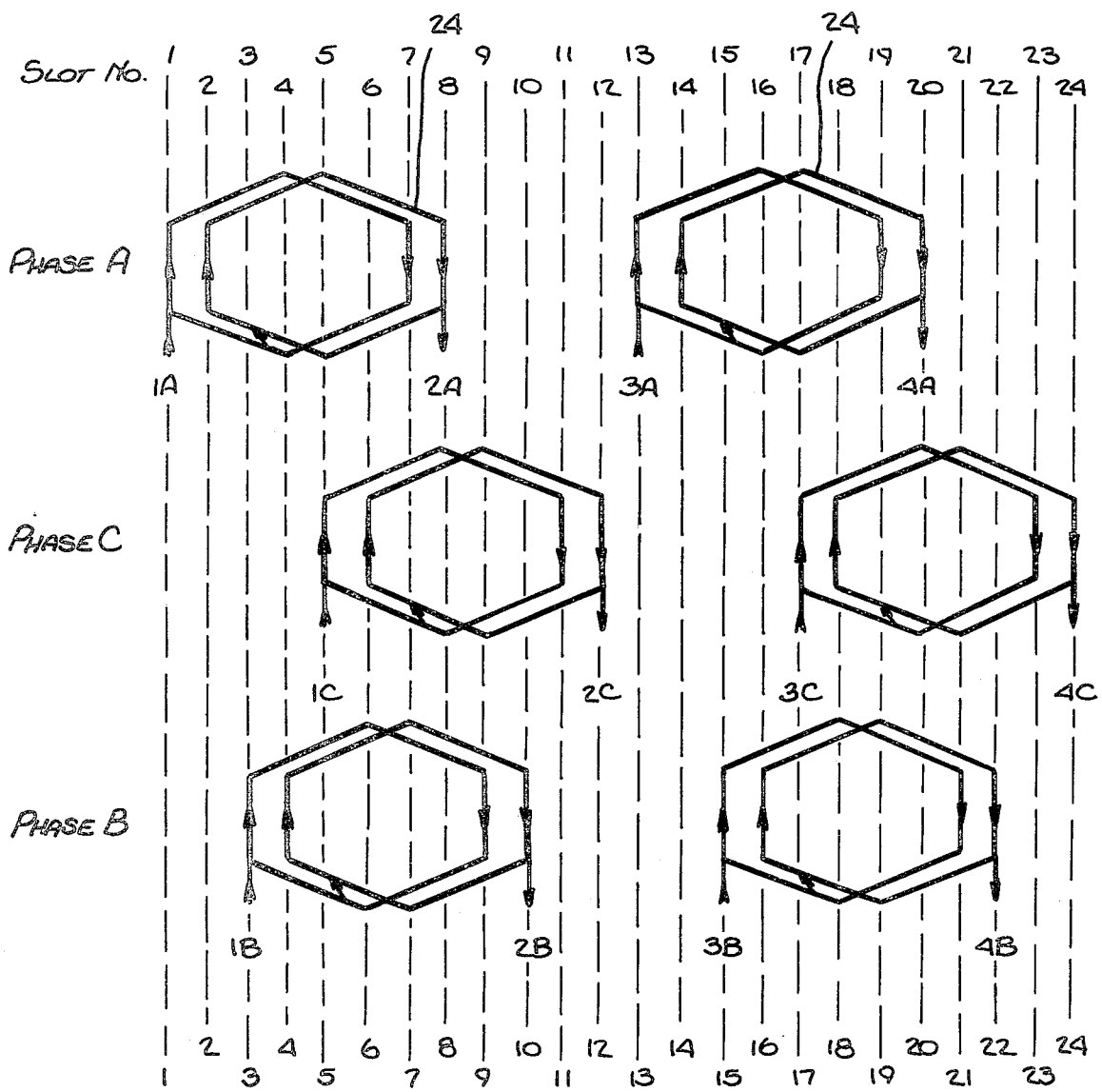
Fig. 2.
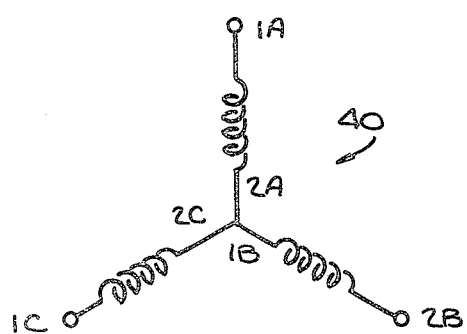
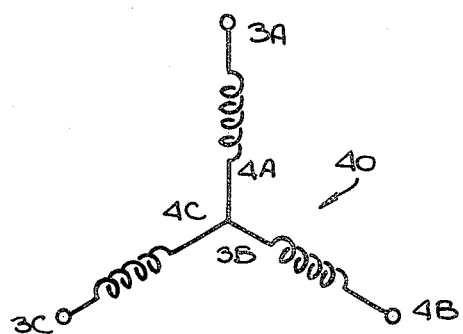

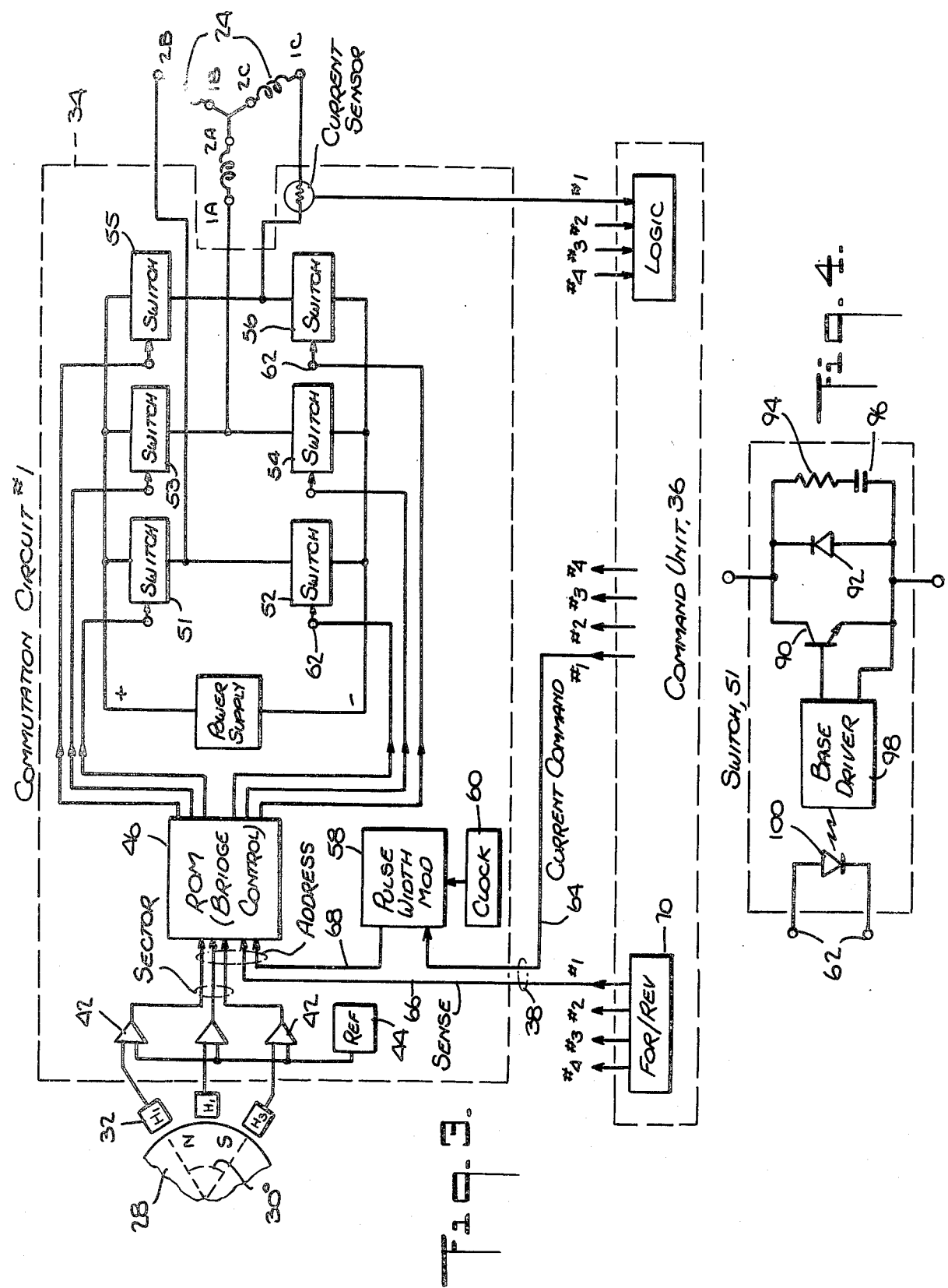

| Sector | Magnetic Vector Across Slot # | Winding Current | |
|---|---|---|---|
| | 1 2 3 4 5 6 7 8 9 10 11 12 | Enters | Exits |
| 1 | | 2B | 1C |
| 2 | | 2B | 1A |
| 3 | | 1C | 1A |
| 4 | | 1C | 2B |
| 5 | | 1A | 2B |
| 6 | | 1A | 1C |

MOTOR WITH REDUNDANT WINDINGS

BACKGROUND OF THE INVENTION

This invention relates to electromechanical energy conversion and, more particularly, to a motor having independently excitable redundant sets of windings which ensure operation in the event of a failure in a winding or its associated drive circuits.

Electric motors are employed in numerous situations which range from the driving of toys to the positioning of aircraft control surfaces. In an electric motor which performs critical functions such as the positioning of aircraft control surfaces it is essential that the motor function properly to ensure the safety of the aircraft.

In the past, reliability of electric motors has been enhanced by tandem connection of two or more motors on a common shaft. Alternatively, a plurality of motors has been connected by differential gearing to ensure that, in the event of failure of one motor, one or more motors is still connected to the load to prevent loss of the drive function.

Such practices are disadvantageous in that a plurality of motors and their mechanical interconnection requires much space. In some applications, the necessity of the additional space would preclude the use of the plurality of motors. In some applications, as in the positioning of control surfaces in aircraft, the additional weight of the plurality of motors as well as the lack of space, would inhibit this approach.

SUMMARY OF THE INVENTION

These problems are overcome and other advantages are provided by an energy conversion system having redundant components, the system providing a conversion from electrical to mechanical energy. In accordance with the invention, the system comprises an electric motor with redundant sets of windings. The switching or commutation of the currents in the individual windings in each set of windings can be accomplished mechanically by a commutator, or electronically by commutation circuits as are used, for example, in a brushless DC (direct current) motor.

With electronic commutation, individual commutation circuits are coupled respectively to individual sets of windings, the commutation circuits being electrically isolated and separately energized. Sensing of the relative position between moving and stationary portions of the motor is accomplished by independent sets of position sensors, such as Hall devices, the sets of position sensors being coupled independently to corresponding ones of the commutation circuits.

Since any motor can be operated as a generator, the system of the invention also provides for the conversion of mechanical energy to electrical energy. In such an application, the redundant components provide for generation of electric power in a plurality of circuits. Failure of one circuit does not interrupt the flow of energy in the remaining circuit or circuits.

In the preferred embodiment of the invention a brushless DC motor comprises a permanently magnetized rotor and a wound stator with redundant windings. The rotor is formed with four or more magnetic poles, north and south poles alternating and equipositioned radially about the rotor axis. For example, in a four-pole rotor a North-South pole pair (360 electrical degrees) occupies 180 mechanical degrees of the rotor. In a six-pole rotor, a pole pair occupies 120 mechanical degrees and in an eight-pole rotor, the configuration of the preferred embodiment, a pole pair occupies 90 mechanical degrees.

The sets of stator windings also are equipositioned about the rotor, two sets being used in a four-pole motor, three sets being used in a six-pole motor, and four sets being used in an eight-pole motor. The windings in each set are connected in conventional wye, delta or star configuration for three-phase excitation, the wye configuration being used in the preferred embodiment. A star configuration may be used for polyphase excitation. Any combination of sets of windings may be excited to operate the motor. The sets of windings are physically spaced apart from each other to reduce coupling and interaction between the sets of windings to sufficiently low values to permit independent operation of the individual sets of windings.

With respect to the commutation circuits which are coupled to the individual sets of windings, the circuits may be operated simultaneously for maximum torque, with reduced torque being available in the event of failure of one or more circuits or windings. Alternatively, the windings or circuits may be held in a standby mode until placed in operation by a monitoring circuit which senses a failure in a winding, a sensor, or a commutation circuit.

The currents in the individual windings of a set of stator windings are controlled so as to provide magnetic field vectors that move in the direction of desired rotor rotation. The movement of the field is coordinated with that of the rotor by signals from the position sensors.

BRIEF DESCRIPTION OF THE DRAWINGS

These aspects and other features of the invention are explained in the following description, taken in connection with the accompanying drawings:

FIG. 2 is a wiring diagram for one-half of the stator of the motor of FIG. 1;

FIG. 3 is a schematic diagram of the electrical circuitry of FIG. 1 with portions of the circuitry being shown in block diagram form;

FIG. 4 of a schematic diagram of a switch in a bridge circuit of FIG. 3;

DESCRIPTION OF THE PREFERRED EMBODIMENT

Figure 1:
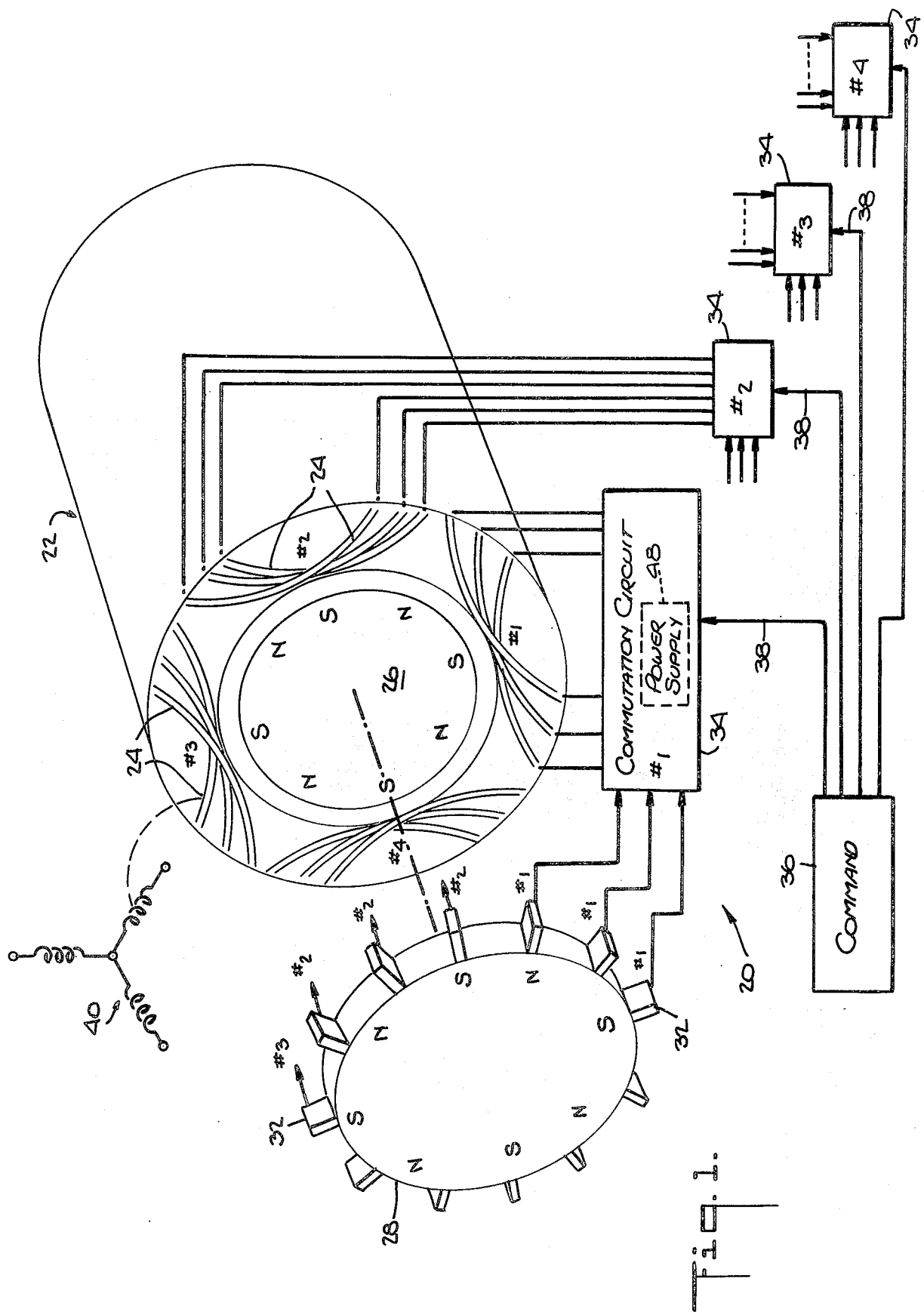
FIG. 1 shows an energy conversion system constructed in accordance with the invention, the figure including a diagrammatic sectional view of a brushless DC motor with redundant windings, commutation circuits of the system being shown in block diagram form.

Referring now to FIG. 1, there is shown a system 20 for providing a conversion from electrical to mechanical energies which, in accordance with the invention, incorporates a motor stator 22 having redundant sets of stator windings 24. The motor 20 is a DC brushless motor having four pairs of magnetic poles, the north and south poles (designated N and S in the figure) alternating in location around the rotor 26. A permanently magnetized disc 28, having a magnetic pole configuration corresponding to that of the rotor 26, is mechanically coupled to the rotor 26 by the rotor shaft 30, indicated by a dashed line. Four sets of Hall sensors 32 are positioned uniformly about the disc 28 for sensing the presence of the magnetic field of the disc, and for developing signals which indicate relative positions of rotor and stator. The north poles are spaced apart from each other by an angle of 90 degrees, and from adjacent south poles by an angle of 45 degrees. The Hall sensors 32 are spaced apart from each other by an angle of 30 degrees, and the sets of sensors #1, #2 and #3 are displaced 90 degrees apart.

Commutation of the currents in the windings 24 is provided by commutation circuits 34 which are coupled to corresponding sets of three sensors 32. A separate commutation circuit 34 is provided for each of three windings 24 for redundant operation of the stator 22. A command unit 36 applies signals on lines 38 to each of the commutation circuits 34 to produce a desired stator current and direction of rotation of the rotor 26. Each individual set of three sensors 32, positioned over an arc of 60 degrees, is coupled to a commutation circuit 34. The signals from the three sensors in each set #1, #2 or #3, indicate rotor position to the respective commutation circuit, #1, #2 or #3, facilitating control of winding currents in the respective set of windings. The use of Hall sensors in electronic commutation of stator windings 24 is described in Malkiel U.S. Pat. No. 3,783,359 dated Jan. 1, 1974, and Persson U.S. Pat. No. 4,086,519 dated Apr. 25, 1978.

With reference also to FIG. 2, the sets of windings 24 are spaced apart from each other and located uniformly about the stator of the motor 22. The windings 24 of each set are connected in a wye circuit as shown schematically by a circuit 40. Two circuits 40 with terminals identified as 1A, 2B and 1C and 3A, 3C and 4B are also shown in FIG. 2. In the preferred embodiment of the invention, the windings 24 are contained within 48 stator slots of which 24 slots are indicated diagrammatically in FIG. 2 by dashed vertical lines. While the diagram of FIG. 2 shows only one half of the stator slots, it is to be understood that the remaining half is identical to the first half. As shown in the figure for slots 12 and 13, there is no overlapping of the wires of the winding 24 between each set and adjacent sets. This separation reduces magnetic coupling between the adjacent sets of windings 24 sufficiently to permit each set of windings 24 to be operated independently of the other sets of windings 24.

The windings 24 in the first set are given terminal designations 1A and 2A for the first winding of the set, 1B and 2B for the second winding of the set, and 1C and 2C for the third winding of the set. With respect to the windings 24 of the second set, the designations are 3A and 4A for the first winding, 3B and 4B for the second winding, and 3C and 4C for the third winding. The windings 24 in each set are displaced 30° from each other so that when they are energized by the commutation circuits in progression, the resultant magnetic vectors will progress in the direction of desired rotor rotation.

The physical and magnetic separation between adjacent winding sets in this motor distinguishes it from the conventional motor in which adjacent winding sets overlap, and occupy common slots. Energization of a single winding set of the motor 22 provides sufficient torque for driving a load (not shown) to which the motor 22 is coupled. For redundant operation, a second winding set may be activated in the event that a failure occurs in the windings 24 or commutation circuit 34 of the first set or, alternatively, two or more winding sets may be simultaneously energized to provide the redundant operation, the energization of a plurality of the winding sets producing an increased torque for driving the load. In the event that only one of the winding sets is energized, the magnetic vectors produced by that set are seen to advance within the arc corresponding to one pole pair of the rotor 26, pulling the rotor 26 through a rotation of 45 degrees. Motion of the pole pair through this angle is coordinated with the motion of the stator magnetic vector by the set of sensors 32 associated with the winding set 24. The foregoing process repeats for each 90 degrees of rotation of the rotor 26.

As shown in the diagram of FIG. 2, the winding 24 for phase A uses slots #1, #2, #7 and #8, and is the only winding in the slots. The winding 24 for phase B of the first set utilizes slots #3 and #9, and the slots #4 and #10. The winding 24 of phase C is displaced still further to the right in the diagram of FIG. 2, occupying the slots #5, #11, #6 and #12.

Referring now to FIG. 3, the Hall sensors 32 and a sector of the disc 28 are shown diagrammatically, the sensors 32 being shown adjacent to a pole-pair of the disc 28. The commutation circuit 34 comprises three comparators 42 and a source 44 of a reference signal, individual ones of the sensors 32, identified as H1, H2 and H3 being coupled to corresponding ones of the comparators 42. The sensors 32 produce sinusoidal signals with steady rotation of the disc 28. As will be described with reference to FIG. 6, the comparators 42 convert the signals of the sensors 32 to on-off signals corresponding to the polarity of the Hall voltage. The three signals of the three comparators 42 comprise a three-bit signal which identifies the rotor sector in increments of 60 electrical degrees, corresponding to 15 mechanical degrees of rotor rotation.

The commutation circuit 34 further comprises an addressable logic array such as a read-only memory (ROM) 46, a power supply 48, six power switches 51-56, a pulse width modulator 58 and a clock 60. Each of the commutation circuits 34 of FIG. 1 is constructed in the same fashion. Further redundancy may be provided by supplying power to each bridge from a separate and independent source.

The six switches 51-56 are constructed according to FIG. 4. The switches 51-56 form a bridge circuit which supplies current to the windings 24 of a single winding set. In FIG. 1, six lines are drawn from a set of the windings 24 to a commutation circuit 34, the six lines corresponding to the six terminals of the three windings 24. For simplicity, only the connections between the first and second of the commutation circuits 34 with their respective sets of windings 24 are shown in FIG. 1, it being understood that the remaining two sets of windings 24 are also connected to their respective circuits 34.

The switches 51-56 are controlled by signals from the memory 46. A positive terminal of the supply 48 is coupled to the switches 51, 53 and 55 while the negative terminal of the supply 48 is coupled to the switches 52, 54 and 56. Each of the switches 51-56 is placed either in a state of conduction or a state of non-conduction by the control signal applied to its terminal 62. Thus, by way of example, assuming the switches 51, and 56 to be in states of conduction while the remaining switches 52, 53, 54 and 55 are in states of non-conduction, then current flows from the positive terminal of the supply through the switch 51 into terminal 2B of the set of windings 24, out of the winding set by the terminal 1C, and returns to the negative terminal of the supply 48 by the switch 56. By appropriate selection of the states of conduction and non-conduction for respective ones of the switches 51–56, currents can be applied to respective windings 24 of the set to produce progressive displacement of the magnetic vector in the portion of the stator containing said windings.

The magnitude of the currents supplied to windings 24 is controlled by pulse width modulation (PWM), the duty cycle of the modulation being varied to vary the average value of the winding current. Modulation of the current is provided by the modulation of a clock pulse signal of the clock 60 by the pulse width modulator 58. The period of the clock pulse signal is less than the L/R time constant of a winding 24 so that the inductance and resistance of the winding smoothes pulsations of the winding current. The intended level of current is provided by a voltage on lines 64 from the command unit 36, the modulator 58 increasing the pulse width in accordance with the magnitude of the voltage on line 64. The sensor of rotor rotation, clockwise or counter-clockwise is provided by a on-off signal on line 66 from the command unit 36. The current command voltage and the sense signal are both included within the line 38 of FIG. 1. The output signal of the modulator 58 on line 68 is also an on-off signal. The on-off signals of the comparators 42 which designate the rotor sector, in combination with the direction of PWM state signals on lines 66 and 68, serve as an address for the memory 46. For each address, the memory 46 provides a corresponding output state on the terminals 62 of the respective switches 51–56. The windings 24 are thus supplied with a current of the required sense and magnitude to produce the desired magnetic field vectors. The portion of the address on line 68 serves to turn the current on or off with a duty cycle controlled by that signal.

The single command unit 36 of FIGS. 1 and 3 provides four separate output signals on each of the lines 38 to the corresponding commutation circuits 34. The command unit 36 comprises a forward/reverse selector 70 which generates the on-off signal on line 66 commanding clockwise or counter-clockwise torque. Four output lines are shown for coupling the sense signal of the selector 70 to each of the four commutation circuits 34, although the same signal may be coupled to all four circuits.

The current command signal 36 represents the torque level desired from the motor, and is derived from circuits which respond to external conditions such as manual commands, closed loop control signals and the like.

Each redundant commutation circuit is under control of signal lines from a command unit 36, which can detect failures in the circuit or the motor section under its control. For example, the total power supply current consumed by the motor section may be monitored, and failure may be sensed as an under or over-current condition. When a failure is detected, the motor or circuit which has failed may be removed from service by the redundancy control.

The torque which is commanded for all redundant motors in this combination is distributed among the active circuits by the current command unit. This unit may command all the torque to be supplied by one motor section, two, or any combination of sections, depending on signals from the failure detector. The transfer from any combination of motor sections to any other may be automatic or under manual control not shown since such circuits are well known to those experienced in motor control.

Referring now to FIG. 4, the switch 51 of FIG. 3, and similarly the switches 52–56, comprise a transistor 90, a diode 92, a resistor 94, a capacitor 96, a base drive circuit 98 coupled across the base-emitter junction of the transistor 90, and a photo-diode 100 which is coupled to the input terminals 62. The photo-diode 100 converts an electric signal across the terminals 62 to an optical signal for activating the base driver circuit 98. The use of optical coupling permits the switch 51 to float at a voltage which is independent of the voltage at the terminals 62. The circuit 98 produces a state of conduction or non-conduction in the transistor 90 in accordance with the magnitude of the signal across terminals 62. The diode 92 permits current in the stator windings to flow through the switch 51 in a direction opposite that of the transistor 90, and thereby protects the transistor 90 when reverse current or voltage is induced by the motor 20. The resistor 94 and the capacitor 96 aid in suppressing the transient voltages in the winding which result from sudden transitions between the states of conduction and non-conduction in the transistor 90.

Figures 5, 6:
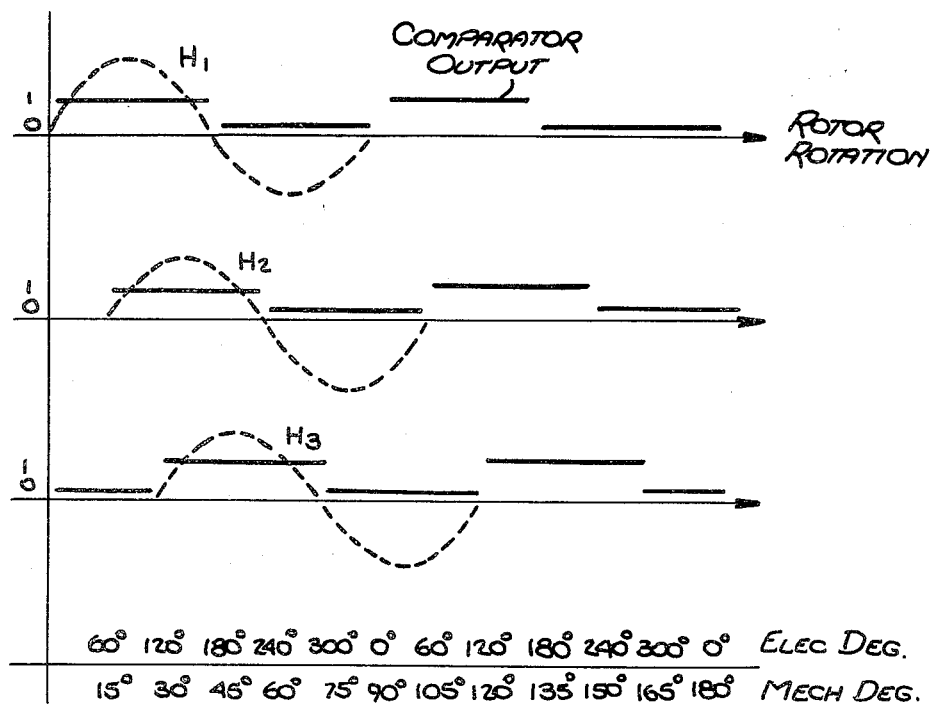
FIG. 5 is a table showing the terminals of a set of stator windings, the terminal designations being in accordance with those of FIGS. 2 and 3.
FIG. 6 is a set of graphs portraying the Hall voltages in dashed traces with the corresponding on-off signals addressing a memory of FIG. 3.

Referring now to FIG. 5, the table shows the entry and exit terminals of the set of windings 24 of FIGS. 2 and 3 corresponding to each electrical sector as sensed by the Hall sensors 32. The first column of the table designates the specific ones of the six sectors, the third column designates the terminals of the wye circuit configuration through which the current enters the windings 24, and the fourth column indicates the corresponding terminals through which the current exits the windings 24. The second column shows the resultant magnetic vector for winding currents indicated in each sector. The progression of states shown in the diagram will occur with the sense of rotation in which rotor poles are moving toward the left, that is from slot #12 towards slot #1.

The diagram shows that the magnitude of the vectors produced in each state of the windings is the same, being produced in some sectors by four adjacent slots and in other sectors by two separate groups of two slots each. Since motor torque is proportional to the magnitude of the vector, it tends to be a function of current level but not of the sector.

Reversal of torque direction in a given sector is achieved by substituting the winding state of the sector whose number is three higher or three lower. This reverses the sense of the magnitude vectors without displacing them, as will be seen by inspection of FIG. 5. The forward/reverse signal 70 accomplishes this selection.

Referring now to FIG. 6, there are presented three graphs corresponding to the Hall voltages of the three Hall sensors 32 of FIG. 3. The Hall voltages are represented by dashed traces while the corresponding on-off output of the corresponding comparators 42 are portrayed with solid lines. The three graphs are shown in registration with each other and in registration with the corresponding locations as designated in a scale (at the bottom of the figure) in both electrical degrees and mechanical degrees. The mechanical degrees represent the physical rotation of the rotor. Since the pattern of the magnetic field of the disc 28, as well of that of the rotor 26, repeats periodically four times in one revolution, 60 electrical degrees correspond to 15 mechanical degrees. Thus, 360 degrees of Hall voltage is produced during 90 degrees of rotor rotation. By examining the three on-off signals of the three graphs corresponding to a specific number of degrees, as designated by the bottom scale, the individual bits of a three-bit word become apparent, the three-bit word identifying the sector of FIG. 3 in a Gray code. For example, at 20 mechanical degrees, the three bit word is 110; at 70 mechanical degrees the three bit word is 001. It may be seen by inspection of FIG. 6 that there are six sectors in each interval of 360 electrical degrees with each sector being identified by a different three bit word. The set of Hall sensors 32 thus designates the six sectors to the commutation circuits 34, enabling the commutation circuits to establish winding currents in accordance with the desired torque direction and magnitude.

It is to be understood that the above-described embodiment of the invention is illustrative only and that modifications thereof may occur to those skilled in the art. Accordingly, this invention is not to be regarded as limited to the embodiment disclosed herein, but is to be limited only as defined by the apppended claims.

What is claimed is:

1. A DC electric servomotor comprising:
    a pair of relatively movable members, one being the stator and the other being the rotor of said electric servomotor;
    said stator including at least two non-overlapping sets of distributed redundant windings spaced apart for minimal magnetic coupling therebetween, each of said windings being independently energizable to produce a reversible magnetic field for rotating said rotor in either direction;
    said redundant winding being mounted on said stator such that torque summing is achieved from the torques generated by the individual ones of said redundant windings; and
    a separate commutation circuit for each set of redundant windings, said commutation circuits each being connected to a different one of said sets of redundant windings to produce the moveable magnetic field from a DC power supply for causing rotation of said rotor.

2. A servomotor according to claim 1 wherein said rotor includes permanent magnets for producing a field cooperating with said moveable magnetic field for causing synchronous motor rotation.

3. A servomotor according to claim 1 wherein said commutation circuits each include a position sensor to indicate the relative position between said rotor and said stator and solid state switching circuits for controlling energization of the associated set of redundant windings in accordance with the rotor position.

* * * * *